US011447672B2

(12) United States Patent
Milliman et al.

(10) Patent No.: US 11,447,672 B2
(45) Date of Patent: Sep. 20, 2022

(54) TAPE WITH ACRYLIC-FREE ADHESIVE

(71) Applicant: Avery Dennison Corporation, Glendale, CA (US)

(72) Inventors: Henry Milliman, Willoughby, OH (US); Thomas C. Epple, Madison, OH (US)

(73) Assignee: Avery Dennison Corporation, Glendale, CA (US)

( * ) Notice: Subject to any disclaimer, the term of this patent is extended or adjusted under 35 U.S.C. 154(b) by 313 days.

(21) Appl. No.: 15/319,945

(22) PCT Filed: Jun. 25, 2015

(86) PCT No.: PCT/US2015/037701
§ 371 (c)(1),
(2) Date: Dec. 19, 2016

(87) PCT Pub. No.: WO2015/200641
PCT Pub. Date: Dec. 30, 2015

(65) Prior Publication Data
US 2018/0208818 A1  Jul. 26, 2018

Related U.S. Application Data

(60) Provisional application No. 62/016,794, filed on Jun. 25, 2014.

(51) Int. Cl.
| | | |
|---|---|---|
| C09J 193/04 | (2006.01) | |
| C09J 153/02 | (2006.01) | |
| C09J 7/38 | (2018.01) | |
| C08L 21/00 | (2006.01) | |
| C08L 53/02 | (2006.01) | |
| C09J 7/24 | (2018.01) | |
| B29C 65/50 | (2006.01) | |
| B29C 65/00 | (2006.01) | |
| B29L 7/00 | (2006.01) | |

(52) U.S. Cl.
CPC ......... *C09J 193/04* (2013.01); *B29C 65/5042* (2013.01); *B29C 66/43* (2013.01); *B29C 66/727* (2013.01); *C08L 21/00* (2013.01); *C08L 53/02* (2013.01); *C09J 7/243* (2018.01); *C09J 7/387* (2018.01); *C09J 153/02* (2013.01); *B29K 2995/0015* (2013.01); *B29L 2007/002* (2013.01); *C09J 2423/046* (2013.01); *C09J 2453/00* (2013.01); *C09J 2493/00* (2013.01); *Y10T 428/2848* (2015.01); *Y10T 428/2883* (2015.01)

(58) Field of Classification Search
None
See application file for complete search history.

(56) References Cited

U.S. PATENT DOCUMENTS

| | | | |
|---|---|---|---|
| 3,932,328 A * | 1/1976 | Korpman | C09J 153/02 524/271 |
| 4,944,993 A | 7/1990 | Raykovitz et al. | |
| 5,028,646 A * | 7/1991 | Miller | A61F 13/58 524/271 |
| 5,599,620 A * | 2/1997 | Huskey | A61F 13/58 428/343 |
| 5,688,589 A | 11/1997 | Schacht et al. | |
| 5,705,551 A * | 1/1998 | Sasaki | C09J 153/02 524/366 |
| 5,851,663 A | 12/1998 | Parsons et al. | |
| 5,942,299 A | 8/1999 | Tynan et al. | |
| 6,022,914 A * | 2/2000 | Nowak | C08K 5/0066 524/101 |
| 6,150,017 A | 11/2000 | Burmeister et al. | |
| 6,403,214 B1 | 6/2002 | Zimmerman et al. | |
| 6,489,024 B2 | 12/2002 | Griffith et al. | |
| 6,632,498 B1 | 10/2003 | Zimmerman et al. | |
| 6,723,405 B1 | 4/2004 | Zimmerman et al. | |
| 6,740,711 B1 | 5/2004 | Lipman et al. | |
| 7,141,284 B2 | 11/2006 | Newton et al. | |
| 7,309,524 B2 | 12/2007 | Krawinkel | |
| 8,192,837 B2 | 6/2012 | Wang | |
| 8,552,084 B2 | 10/2013 | Tynan et al. | |
| 8,592,035 B2 | 11/2013 | Sakurai et al. | |
| 8,703,263 B2 | 4/2014 | Goubard | |
| 2002/0119292 A1* | 8/2002 | Venkatasanthanam | B29C 47/0021 428/174 |
| 2002/0161085 A1 | 10/2002 | Gibes et al. | |
| 2004/0007322 A1* | 1/2004 | Lechat | C09J 7/387 156/289 |
| 2004/0241370 A1 | 12/2004 | Cline et al. | |
| 2005/0228114 A1* | 10/2005 | Gelles | A61L 15/585 524/502 |

(Continued)

FOREIGN PATENT DOCUMENTS

| | | |
|---|---|---|
| WO | 99/00461 | 1/1999 |
| WO | 2012/066326 | 5/2012 |

OTHER PUBLICATIONS

Kronenberg, Bernd et al., "Adhesive Tape", machine translation of WO9900461 A1, Jul. 1, 1999 (Year: 1999).*

(Continued)

*Primary Examiner* — Anish P Desai (57) ABSTRACT

Adhesive tapes are described which find particular application for sealing joints or regions between adjacent panels such as rigid foam insulation panels. Also described are methods of using the sealing tapes and systems of sealed panels using the sealing tapes.

20 Claims, 2 Drawing Sheets

(56) References Cited

U.S. PATENT DOCUMENTS

2006/0234580 A1* 10/2006 Sustic .................... B32B 27/08
                                                                                                        442/149
2008/0023136 A1    1/2008  Spies et al.
2008/0214078 A1    9/2008  Vanmarcke et al.
2009/0298995 A1  12/2009  Krawinkel
2011/0086563 A1    4/2011  Lange et al.
2011/0162782 A1    7/2011  Goubard
2013/0202787 A1    8/2013  Hu et al.
2014/0057091 A1    2/2014  Krawinkel et al.

OTHER PUBLICATIONS

International Preliminary Report on Patentability issued in corresponding IA No. PCT/US2015/037701 dated Dec. 27, 2016.
International Search Report and Written Opinion issued in corresponding IA No. PCT/US2015/037701 dated Sep. 9, 2015.

* cited by examiner

TAPE WITH ACRYLIC-FREE ADHESIVE

CROSS-REFERENCE TO RELATED APPLICATION

The present application is a 371 of International Application No. PCT/US15/37701, which was published in English on Dec. 30, 2015, and claims the benefit of U.S. Provisional Patent Application No. 62/016,794 filed Jun. 25, 2014, both of which are incorporated herein by reference in their entireties.

FIELD

The present subject matter relates to adhesive tapes for a variety of applications, and particularly for joining or adhering panels. In specific applications, the tapes find use for sealing along joints of rigid foam insulation panels.

BACKGROUND

Sealing tapes are used to fill and seal elongate voids or gaps in order to prevent air drafts, water ingress or to prevent heat loss. Sealing tapes generally comprise an elongate strip of material which is placed along edges of adjacent structures or articles.

Many sealing tapes include a foam strip or other flexible backing having an adhesive layer on one side which enables the strip to be adhered to a surface. Such strips however, tend to wear or degrade over time. Such wear or degradation causes the strip or backing material to break from the adhesive layer thereby detaching from the surface to which it was previously adhered and causing the otherwise sealed gap to open.

Certain sealing tapes are designed to strongly adhere to a variety of underlying surfaces such as insulation panels. In many applications this is desirable in order to reduce the potential for opening of a sealed gap. However, strong adhesion between a sealing tape and one or more underlying panels can result in damage to the panel(s). For example if during installation, tape is incorrectly applied or misaligned with the gap to be covered, the tape must be removed. If strong adhesion occurs between the tape and the panel(s), removal of the tape can damage the panel. Damage may result from material of the panel adhering to the tape and being torn or separated from remaining material of the panel as the tape is removed. Foam insulation panels are particularly susceptible to damage when removing adhesive tape from the panels. It may also be necessary to remove tape after installation if a panel needs to be replaced or re-installed. Removal of tape can damage adjoining panels in addition to the panel being replaced.

Accordingly, in view of these and other deficiencies of currently available sealing tapes, a need remains for an improved sealing tape which avoids or at least reduces the potential of damaging substrates to which it is attached, yet which also provides a sufficiently strong adhesive bond to promote gap sealing.

SUMMARY

The difficulties and drawbacks associated with previous approaches are addressed in the present subject matter as follows.

In one aspect, the present subject matter provides a sealing tape comprising a thin backing defining a first face and an oppositely directed second face. The sealing tape also comprises a layer of adhesive disposed on at least one of the first face and the second face of the backing. The adhesive includes (i) at least one rubber agent(s), (ii) at least one solid resin(s), and (iii) at least one liquid resin(s). The adhesive exhibits a cohesive failure characteristic.

In another aspect, the present subject matter provides a method of sealing a gap defined between a first article and a second article. The method comprises identifying a gap defined between a first article and a second article. The method also comprises providing a sealing tape having a thin backing with a first face and an oppositely directed second face, and a layer of adhesive disposed on at least one of the first face and the second face of the backing. The adhesive includes (i) at least one rubber agent(s), (ii) at least one solid resin(s), and (iii) at least one liquid resin(s). The adhesive exhibits a cohesive failure characteristic. The method also comprises contacting and adhering at least a portion of the layer of adhesive with a portion of both of the first article and the second article such that the sealing tape overlies at least a portion of the gap, thereby sealing the gap.

In another aspect, the present subject matter provides a system of adjacent articles defining a sealed gap there between. The system comprises a first article defining at least one edge. The system also comprises a second article defining at least one edge. The first article is positioned adjacent to the second article such that a gap is defined between an edge of the first article and an edge of the second article. The system also comprises a sealing tape having a thin backing with a first face and an oppositely directed second face, and a layer of adhesive disposed on at least one of the first face and the second face of the backing. The adhesive exhibits a cohesive failure characteristic and includes (i) at least one rubber agent(s), (ii) at least one solid resin(s), and (iii) at least one liquid resin(s). The sealing tape is disposed over at least a portion of the gap and the layer of adhesive is contacting and adhered to at least a portion of the first article and the second article.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides adhesive sealing tapes that have a variety of beneficial properties and characteristics. In certain embodiments, the tapes have particular properties that significantly reduce the potential for damaging an underlying adhered substrate such as a foam panel when removing the tape therefrom. In many embodiments of the present subject matter, the adhesive used in the tapes exhibits a particular cohesive fail characteristic such that after adhesion and bonding of the tape to the substrate and upon removal of the tape, cohesive failure occurs within the adhesive rather than within the substrate material. Furthermore, in many embodiments sealing tapes are provided which exhibit relatively high peel forces such as for example greater than 2.0 pounds per inch (350 N/m), and in particular versions greater than 2.5 pounds per inch (438 N/m). The present subject matter also provides various methods of use of the tapes, and systems of panels and tapes.

Before turning attention to the tapes, systems using such tapes, and related methods and applications of the present subject matter, it is instructive to consider the unique cohesive fail characteristic exhibited by adhesive layers used in the present subject matter tapes. Without being limited to any particular embodiment or theory, it is believed that several phenomena are responsible for the increased peel force associated with a cohesive split mechanism of the present subject matter tapes. First, in a conventional adhesive failure mechanism the adhesive is bonded to one substrate while failing from another substrate. In a cohesive failure mechanism the adhesive is bonded to two substrates while failing at a new interface, essentially doubling the bonding area resulting in a higher peel force. Second, the actual act of splitting the adhesive dissipates a significant amount of energy which requires a higher force to overcome. There is a limit to how high the peel force can be compared to the peel needed to cause a failure of the face of the substrate. In the case of adherence to foam panels, the face of the foam typically tears at about 2 pounds if the adhesive does not fail cohesively. When utilizing the present subject matter sealing tapes which exhibit the cohesive fail characteristic, one can achieve in many embodiments, 3 to 4 pounds of peel. The term "cohesive failure" as used herein with regard to adhesives, refers to a characteristic exhibited by a layer of adhesive such that when a face of the layer of adhesive is contacted with a substrate and then removed from the substrate, an adhesive residue remains with the substrate.

Adhesive Tapes

The adhesive tapes of the present subject matter comprise a backing and a layer or region of an adhesive on at least one of the faces of the backing. Although many embodiments of the present subject matter are single sided adhesive tapes, the present subject matter includes double sided (also known as two sided) adhesive tapes in which both oppositely directed faces of the backing include adhesive disposed thereon. In particular embodiments, the present subject matter includes two or more layers of adhesive which are in contact or adjacent with one another. The second layer of adhesive can be acrylic free. With a two layer adhesive configuration it would be relatively easy to design the system to fail at the interface between the two adhesives versus formulating one adhesive to fail cohesively. One or more optional release liners can be provided on the otherwise exposed adhesive face(s). Each of these components of the tapes is described in greater detail as follows.

Backing

The backing of the present subject matter tapes is a thin, flexible layer which is sufficiently strong and durable to effectively be adhered along gaps or regions to be sealed such as for example between adjacent panels and like articles. In many embodiments, the backing is extensible, extendable, and/or stretchable. However, the present subject matter includes nonextensible, nonextendable, and/or nonstretchable materials.

The backing can be formed from a wide array of materials including but not limited to polymeric materials, homogenous films of such, woven and/or nonwoven materials, paper and paper-based materials, composite materials, and combinations of any of these.

Suitable materials for use as the backing layer include polyolefins such as polyethylene including low density polyethylene (LDPE), high density polyethylene (HDPE), and linear low density polyethylene, polypropylene, polybutylene, polyisoprene, and their statistical and block copolymers (OBCs). Low density polyethylene is typically characterized as polyethylene having a density within a range of 0.910 to 0.940 g/cm$^3$. High density polyethylene has minimal branching and is typically characterized as polyethylene having a density in the range of 0.930 to 0.970 g/cm$^3$. It will be appreciated that the present subject matter includes a wide variety of materials for the backing and is not limited to any of the materials noted herein.

In one embodiment, the backing layer has an overall thickness of at least about 1 mil (about 25 microns), at least about 3 mils (about 75 microns), or at least about 5 mils (about 125 microns), and has a thickness of no greater than about 15 mils (about 380 microns), no greater than about 11 mils (about 280 microns), or no greater than about 10 mils (about 250 microns). However, it will be understood that these are representative thicknesses and that the present subject matter includes backings having thicknesses greater than or lesser than these representative thicknesses.

Adhesive

In certain versions of the present subject matter, the adhesive used in the sealing tapes is a rubber based hot melt adhesive composition. In certain embodiments, the adhesive is a solvent based adhesive, and particularly a solvent based rubber adhesive. And, in particular embodiments, the adhesive is free of any acrylic or acrylate components.

The adhesives used in many of the tape embodiments comprise at least three components: (i) at least one rubber agent(s), (ii) at least one solid resin(s), and (iii) at least one liquid resin(s). The adhesives may comprise additional components such as for example antioxidants, solvents, and/or additives as described herein.

Table 1 set forth below lists typical and particular proportions of the noted components. All percentages noted herein are weight percentages unless noted otherwise.

TABLE 1

Components of Adhesive(s) In Sealing Tapes of Present Subject Matter

| Component | Typical (%) | Particular (%) |
|---|---|---|
| Rubber agents | 25-45 | 30-40 |
| Solid resin(s) | 45-65 | 49-59 |
| Liquid resin(s) | 1-20 | 5-15 |
| Additive(s) | 0.1-5 | 0.5-2 |

A wide array of rubber agent(s) can be used in the adhesives of the present subject matter tapes. Nonlimiting examples of suitable rubber agents include polymers or copolymers of styrene-butadiene (SB), styrene-butadiene-styrene (SBS), styrene-isoprene (SI), styrene-isoprene-styrene (SIS), random styrene-butadiene (SBR), styrene-butadiene-isoprene multi-block (SBIBS), or polyisoprene. Fully and partially hydrogenated rubber agents can be used. Combinations of these agents can be used.

Examples of suitable styrene-butadine-styrene (SBS) which are commercially available include KRATON D1101 and KRATON D1118 from Kraton Performance Polymers and VECTOR 2518D from Dexco Polymers. Examples of suitable styrene-isoprene-styrene (SIS) include KRATON D1107P and VECTOR 411A. An example of a suitable styrene-butadiene-isoprene multi-block (SBIBS) is KRATON S6455. Kraton GRP-6924 is an example of a hydrogenated styrene block copolymer.

The styrene-butadiene copolymer(s) component of the adhesive compositions used in the present subject matter are typically block or multi-block copolymers having the general configuration: A-B-A or A-B-A-B-A-B- wherein the non-elastomeric polymer blocks A are styrene, while the elastomeric polymer blocks B are butadiene or butadiene which is partially or substantially hydrogenated. The polymeric blocks may be linear or branched. Typical branched structures contain an elastomeric portion with at least three branches which can radiate out from a central hub or can be otherwise coupled together.

In certain embodiments, the adhesive compositions comprise linear A-B-A-B-A multi-block copolymers where the elastomeric block is butadiene and the non-elastomeric block is styrene and the latter is present in concentrations of from about 20% to about 35%, with particular embodiments having a styrene content of about 20% to 30%. Block copolymers marketed commercially at present which meet the above described requirements are available from Dynasol Elastomers under the designation SOLPRENE 1205. Blends of these styrene containing copolymers with other compatible block copolymers may also be employed. SOLPRENE 1205 is a linear random block styrene/butadiene copolymer having a styrene content of 25% in which 17.5% is present as a styrene block.

As noted, the adhesives also comprise one or more solid resin(s). The term "solid resin" as used herein refers to any resin which is solid at ambient temperature and which is compatible with the other components of the adhesive. A wide array of solid resin(s) can be used. Nonlimiting examples of such include aliphatic hydrocarbons such as from $C_5$ to $C_9$, hydrogenated ester rosins, partially hydrogenated ester rosins, aromatic modified ester resins, pentaerythritol resins, hydrogenated pentaerythritol resins, terpene resins, glycerol ester rosin resins, pentaerythritol tall oil, terpene phenolics, glycerol ester rosin resin, and combinations thereof. Nonlimiting examples of suitable aliphatic hydrocarbons used as solid resin(s) include ESCOREZ 1310 and ESCOREZ 2101 available from Exxon Mobile. Examples of a suitable hydrogenated ester rosin is FORAL 85 available from several suppliers such as Eastman Chemical and HERCOLYN D from Pinova. An example of a suitable partially hydrogenated ester rosin is FORALYN from Eastman Chemical. An example of a suitable aromatic modified ester resin is PICCOTAC 7590 from Eastman Chemical. An example of a suitable pentaerythritol resin is PEXALYN 9100 from Pinova. An example of a suitable hydrogenated pentaerythritol resin is PENTALYN H from Eastman Chemical. An example of a suitable pentaerythritol tall oil is SYLVALITE RE 105 L from Arizona Chemical. An example of a suitable terpene phenolic is PICCOLYTE A115 from Eastman Chemical. An example of a commercially available glycerol ester gum rosin resin is RESINALL 625 available from Resinall Corporation.

A variety of liquid resin(s) can be used in the adhesive(s) of the present subject matter sealing tapes. The term "liquid resin" as used herein refers to any resin which is liquid at ambient temperature and which is compatible with the other components of the adhesive. A variety of liquid resin(s) can be used in the adhesives of the present subject matter sealing tapes. Nonlimiting examples of such liquid resin(s) include hydrogenated resin ester, terpene resins, low molecular weight hydrocarbons such as for example $C_5$ hydrocarbons, and combinations thereof. An example of a suitable terpene resin is SYLVARES TR A25 available from Arizona Chemical. An example of a suitable $C_5$ hydrocarbon is WINGTAC 10 available from numerous suppliers. An example of a suitable modified rosin resin for use in the adhesive(s) of the present subject matter sealing tapes is STAYBELITE-E ESTER 3-E which is an ester of hydrogenated rosin. STAYBELITE-E is available from Eastman Chemical.

Regardless of the solid and liquid resin(s), the solid resin(s) which are used in the adhesives of the present subject matter, are compositionally different than the liquid resin(s) utilized.

The amounts or proportions of components (i), (ii), and (iii) of the present subject matter adhesive compositions are set forth in Table 1. Although many embodiments of the present subject matter include adhesives with additional components, the present subject matter includes adhesives consisting exclusively of components (i)-(iii). It is contemplated that a wide range of combinations of rubber agent(s), solid resin(s), and liquid resin(s) could potentially be used in the adhesives of the present subject matter. For example, depending upon the particular application and end use requirements, additional adhesives which exhibit cohesive failure could be formulated from the various rubber and resin combinations disclosed in U.S. Pat. No. 8,703,263.

The adhesives can optionally comprise one or more additives such as oils, antioxidants or stabilizers, flame retardants, pigments, fibers, solvents, and combinations thereof.

Various oils or extending agents may also be present in the adhesive compositions in amounts of 5% to about 30%, and particularly 5% to 25% by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed, are relatively high boiling materials containing only a minor proportion of aromatic hydrocarbons (typically less than 30% and, more particularly, less than 15% by weight of the oil). Alternatively, the oil may be totally non-aromatic. The oligomers may be polypropylenes, polybutenes, hydrogenaged polyisoprene, hydrogenated polybutadiene, or the like, having average molecular weights between about 350 and about 10,000. Vegetable and animal oils include glyceryl esters of the usual fatty acids and polymerization products thereof. Nonlimiting examples of suitable oils include WHITE MINERAL OIL from Kaydol, and RUETA-SOLV D1 available from various suppliers.

A variety of antioxidants or stabilizers can be used in the adhesive(s). Among the applicable antioxidants utilized herein are included high molecular weight hindered phenols and multifunctional phenols such as sulfur and phosphorous-containing phenols. Hindered phenols are known to those skilled in the art and may be characterized as phenolic compounds which also contain sterically bulky radicals in close proximity to the phenolic hydroxyl group thereof. In particular, tertiary butyl groups generally are substituted into the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this steric hindrance thus providing the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octylthio)-1,3,5-triazine; di-n-octadecyl 3,5-di-tert-butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)-propionate].

Nonlimiting examples of commercially available stabilizers and/or antioxidants that can be included in the adhesive compositions of the present subject matter include IRGAFOS 168 commercially available from Ciba Specialty Chemicals and IRGANOX 565, IRGANOX 1076, and ULTRANOX 626 commercially available from BASF and others. IRGAFOS 168 is a hydrolytically stable phosphite processing stabilizer. IRGAFOS 168 is tris(2,4-ditert-butylphenol) phosphite. IRGANOX 565 is 4-{[4,6-bis(octylsulfanyl)-1,3,5-triazin-2-yl] amino}-2,6-di-tert-butylphenol. IRGANOX 1076 is octadecyl-3-(3,5-di-tert.butyl-4-hydroxyphenyl)-propionate. ULTRANOX 626 is bis (2,4-di-t-butylphenyl) pentaerythritol diphosphite. Combinations of these can be used, and potentially with other agents.

These antioxidants or stabilizers, if used, are generally present in amounts of about 0.1% to 5.0% and in particular embodiments about 0.5% to 2.0% by weight.

Flame retardant agents include, but are not limited to, metal oxide hydrates, polyphosphates, melamines, polysiloxanes, organic phosphonates, and combinations thereof. Examples of suitable metal oxide hydrates include magnesium hydroxide and aluminum hydroxide. Examples of suitable polyphosphates include ammonium polyphosphate. Examples of suitable melamines include melamine phosphate. And examples of suitable polysiloxanes include SFR100 which is commercially available from Momentive Performance Materials. A wide array of commercially available flame retardant agents can be incorporated in the adhesives described herein. Nonlimiting examples of flame retardants include DE-83R and CD-75PM from Chemtura Corporation, and FIREMASTER 550 also from Chemtura.

A variety of pigments can be included in the adhesives such as aluminum trihydroxide and titanium dioxide. The adhesives may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc.

A variety of fibers can also be included in the adhesives such as for example glass fibers. Additional fiber types such as nylon fibers, polyolefin fibers, aramid fibers, paper fibers, carbon fibers, and combinations thereof can be used.

One or more solvents or other liquid vehicles can be incorporated in the adhesives as desired. A nonlimiting example of a suitable solvent is toluene. However, it will be appreciated that a wide array of other solvent(s) could potentially be used. The amount or proportion of solvent used can vary, but in many embodiments amounts of from 5% to 200%, more particularly from 10% to 100% are useful, and more particularly from 40% to 60% based upon total solids in the adhesive.

The adhesive compositions are prepared by blending the components in the melt at a temperature of about 130° to 200° C. (about 266° to 392° F.) until a homogeneous blend is obtained, which typically occurs at approximately two hours. Various methods of blending are known to the art and any method that produces a homogeneous blend is satisfactory.

If the sealing tapes include a liner and if the adhesive is a hot melt adhesive, the tapes are generally formed by applying the hot melt adhesive to a continuous layer of the liner at a temperature of about 250° to 350° F. (about 121° to 177° C.) and a coating thickness of 1 to 7 mils (25 to 175 microns, 27 to 185 g/m$^2$). This coating is performed on a roll or extrusion coater run at a speed of about 200 to 1,000 feet per minute (about 61 to 305 meters per minute). If the sealing tapes do not include a liner, the adhesive can be directly coated or otherwise applied to the backing. As previously noted, in certain embodiments a dual layer adhesive configuration can be used. In that case the first adhesive would be coated on the liner and then rolled up and then run through the coater a second time to apply the second layer on top of the first. The present subject matter includes other processes, techniques, and coat weights for forming one or more layers of adhesive on the backing.

Release Liner

In certain embodiments, the sealing tapes include one or more release liners disposed on and covering the adhesive layer(s). The release liners protect the otherwise exposed adhesive face of the tapes, and prior to application of the tapes, are removed. The release liners can be formed from polymeric films, papers, or composite materials for example. Release liners for use in the present subject matter may be those known in the art. In general, useful release liners include polyethylene coated papers with a commercial silicone release coating, polyethylene terephthalate films with a commercial silicone release coating, or cast polypropylene films that can be embossed with a pattern or patterns while making such films, as well as machine oriented or biaxially oriented polypropylene (MOPP, BOPP) and thereafter coated with a commercial silicone release coating. A particular release liner is kraft paper which has a coating of low density polyethylene on the front side with a silicone release coating and a coating of high density polyethylene on the back side. Other release liners known in the art are also suitable as long as they are selected for their release characteristics relative to the adhesive chosen for use.

Figure 1:
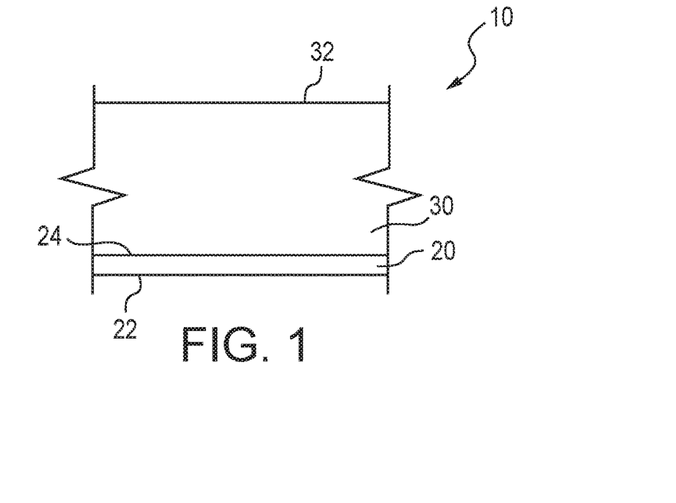
FIG. 1 is a schematic cross sectional view of an embodiment of a sealing tape in accordance with the present subject matter.

FIG. 1 is a schematic cross sectional view of an embodiment of a sealing tape 10 in accordance with the present subject matter. The sealing tape 10 comprises a backing 20 defining two oppositely directed faces 22 and 24. The sealing tape 10 also comprises a layer of adhesive 30. The adhesive layer 30 is disposed on the face 24 of the backing. The adhesive layer 30 defines an adhesive face 32.

Figure 2:
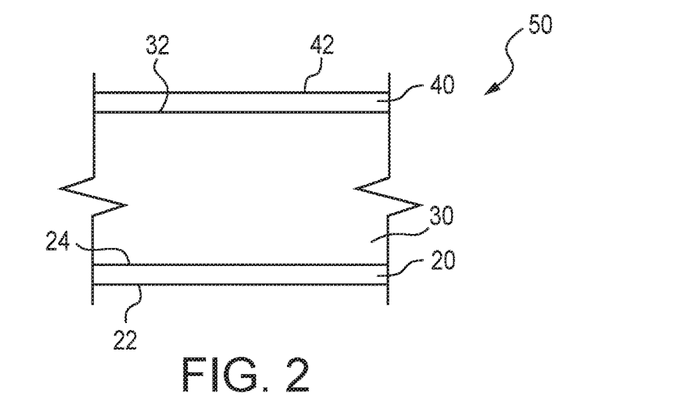
FIG. 2 is a schematic cross sectional view of another embodiment of a sealing tape in accordance with the present subject matter.

FIG. 2 is a schematic cross sectional view of an embodiment of a sealing tape 50 in accordance with another embodiment of the present subject matter. The sealing tape 50 comprises a backing 20 defining two oppositely directed faces 22 and 24. The sealing tape 50 also comprises a layer of adhesive 30 disposed on the face 24 of the backing 20. The adhesive layer 30 defines an adhesive face 32. The sealing tape 50 also comprises a removable release liner 40 disposed on the adhesive face 32. The release liner 40 defines an outer face 42.

Figure 3:
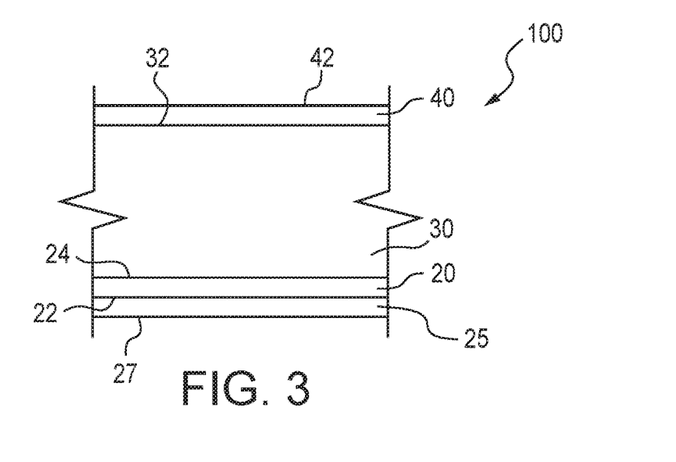
FIG. 3 is a schematic cross sectional view of another embodiment of a sealing tape in accordance with the present subject matter.

FIG. 3 is a schematic cross sectional view of an embodiment of a sealing tape 100 in accordance with another embodiment of the present subject matter. The sealing tape 100 comprises a backing 20 defining oppositely directed faces 22, 24; an adhesive layer 30; a release layer 40 defining an outer face 42; and a secondary layer 25 defining another outer face 27. The secondary layer 25 can be provided to provide additional strength or rigidity or other characteristic to the resulting sealing tape 100. In particular embodiments, the secondary layer 25 can be a second adhesive layer which is disposed on the face 22 of the backing 20. In such versions of the sealing tape, the adhesive face 27 could be exposed or be covered with a release liner (not shown).

Upon being subjected to tensile forces, such as are typical when removing and pulling tape adhered to a substrate, the adhesives of the present subject matter exhibit a particular cohesive fail characteristic such that failure occurs within the adhesive rather than within the material of many substrates, and more specifically within rigid foam insulation panels.

Methods of Use and Systems of Panels and Tapes

The various sealing tapes of the present subject matter can be used to cover and more particularly seal, gaps or interfaces between adjacent articles such as rigid panels. As noted herein, the present subject matter tapes find particular application for sealing between foam insulation panels such as those used in buildings and other structures. For example, the sealing tapes can be used in general construction applications, wall sheathing, wall panel systems, exterior insulation panels, interior insulation panels, roofing, architectural panels, decking, alongside foundations, slab linings, agricultural applications, and specialty applications.

The term "seal" is used herein to refer to covering an otherwise open aperture, region, crack, slit, perforation, exit and/or egress. Once the opening is covered by positioning an effective length of sealing tape over the opening, and adhering the sealing tape to adjacent regions of substrates or panels forming the opening, the seal need not be an absolute seal or an airtight seal. However, in many applications, air flow through the opening is substantially prevented or at least significantly reduced, e.g., by at least 80%, more particularly by at least 90%, and in many embodiments by at least 95%.

The panels and particularly the insulation panels are rigid and formed from foamed materials. The term "foamed" as used herein refers to a material having a plurality of gas or air filled cells generally throughout the material. The panels can be primarily for insulating, but can also be configured to provide support. The panels typically have dimensions of from about 2 feet (610 mm) in width to 6 feet (1.8 m) to about 24 feet (7.3 m) in length in the United States; or 300, 600, or 1,200 mm wide by 2.4, 2.7, and 3 m in length in Europe. Certain insulating panels provide a thermal resistance or R-value of about 4 K ⍰ m$^2$/W per 25 mm thickness, however the present subject matter extends to panels having R-values from about 4 to 60, and particularly from 8 to 50.

Nonlimiting examples of insulation panels with which the present subject matter sealing tapes could potentially be used include panels and panel systems commercially available from Owens Corning such as panels available under the designations FOAMULAR, PROPINK, CW, INSULPINK, THERMAPINK, DURAPINK, INSUL-DRAIN, PINK-DRAIN, and PINKCORE; and from Dow Chemical such as STYROFOAM ROOFMATE, DECKMATE, PLAZAMATE, CLADMATE, WALLMATE, Z-MATE, RESIDING BOARD, AG BOARD, DURAMATE, PERIMATE, SM, SCOREBOARD, ULTRA SL, SUPER TUFF, THERMAX, CAVITYMATE, PANELMATE, UTILITYFIT, FREEZERMATE, HIGHLOAD, RECOVERMATE, and others.

Figure 4:
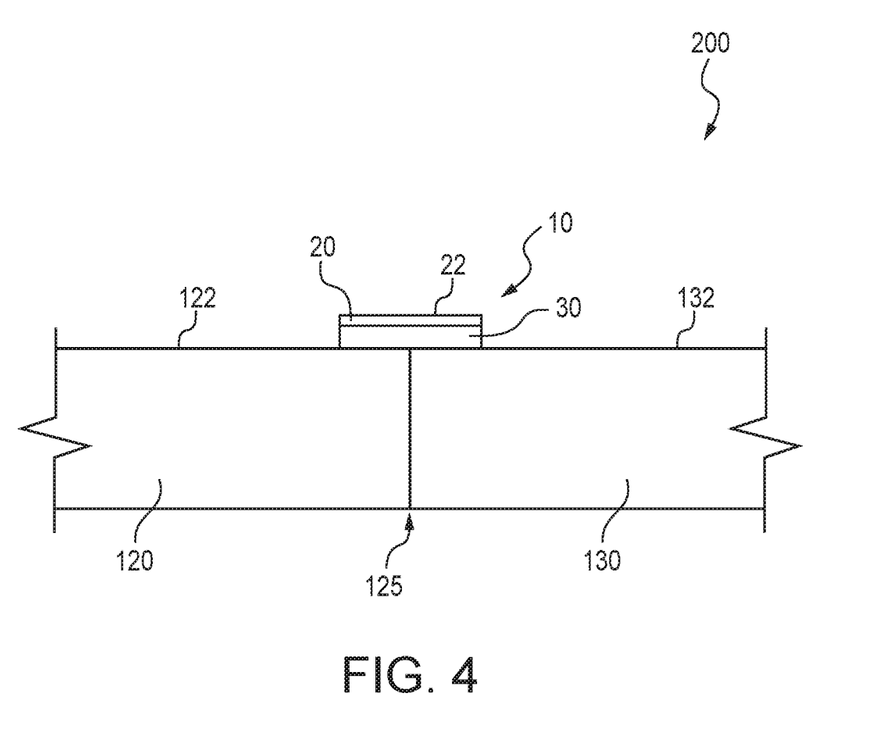
FIG. 4 is a schematic cross sectional view of a system of adjacent panels and the sealing tape of FIG. 1 adhered along an interface between the panels.

FIG. 4 schematically depicts a system 200 of at least two panels 120 and 130 which define a gap 125 or interface between adjacent edges of the panels, and a section or length of a sealing tape such as sealing tape 10 illustrated in FIG. 1. The panels 120 and 130 define outwardly directed faces 122, 132 respectively. The sealing tape 10 is disposed upon edge regions of the panels 120, 130 and is adhered to the faces 122, 132 of the panels. As shown, the adhesive layer 30 contacts portions of the faces 122, 132. In many embodiments, the panels 120 and 130 are foamed panels.

The sealing tapes of the present subject matter can be provided in a range of dimensions. In many embodiments, the sealing tapes are provided in a roll form and lengths or sections of tape are cut from the roll as desired. Typical widths of the sealing tapes are from about 0.5 to about 6 inches (1.25 cm to 15.25 cm), and particularly from 0.75 to 4 inches (1.90 cm to 10.1 cm). However, it will be appreciated that the present subject matter includes tapes having dimensions different than these representative dimensions.

The gaps which result from spaces or interfaces of adjacent panels are typically less than 1 inch (2.5 cm). However, the present subject matter also includes systems of panels and/or other substrates in which resulting gaps are greater than 1 inch.

In addition, although the present subject matter has been described with regard to sealing gaps between two adjacent panels, the present subject matter also includes applications in which gaps or spacings are defined between different substrates such as (i) a panel and a window or door frame, (ii) a panel and a mounting for an opening such as a ventilation duct or liquid conduit, (iii) a panel and a support member, and (iv) a panel and a decorative or trim member.

It will be appreciated that the present subject matter includes a wide array of alternative and variant embodiments of sealing tapes and systems using such tapes and in no way is the subject matter limited to any of the versions described herein.

Examples

In order to evaluate sealing tapes of the present subject matter, several tapes were prepared using different adhesive compositions, all of which are within the scope of the present subject matter.

Samples of sealing tapes were prepared using a backing of stretchable film stock of low density polyethylene (LDPE). One face of the backing was coated with one of three adhesive compositions A-C summarized in Tables 2-4 set forth below.

TABLE 2

| Composition of Adhesive A | |
|---|---|
| Additive | Weight Percent (%) |
| IRGAFOS 168/IRGANOX 565 | 1.00 |
| Solprene 1205 SB | 30.00 |
| Resinall 625 | 59.00 |
| Staybelite Ester 3 | 10.00 |
| TOTAL: | 100.00 |

TABLE 3

Composition of Adhesive B

| Additive | Weight Percent (%) |
|---|---|
| IRGAFOS 168/IRGANOX 565 | 1.00 |
| Solprene 1205 SB | 35.00 |
| Resinall 625 | 54.00 |
| Staybelite Ester 3 | 10.00 |
| TOTAL: | 100.00 |

TABLE 4

Composition of Adhesive C

| Additive | Weight Percent (%) |
|---|---|
| IRGAFOS 168/IRGANOX 565 | 1.00 |
| Solprene 1205 SB | 40.00 |
| Resinall 625 | 49.00 |
| Staybelite Ester 3 | 10.00 |
| TOTAL: | 100.00 |

The adhesive compositions A-C were deposited on a face of the noted backing at a coatweight of 80 g/m².

A portion of the resulting tape samples were subjected to 180° Peel Testing. Another portion of the tape samples were maintained at ambient conditions for a dwell time period of 24 hours. 180° Peel Testing was performed in accordance with standard PSTC Test Method No. 1 at a speed of 12 inches per minute (ipm) with tape sample sizes of 1 inch by 8 inches.

Tables 5 and 6 summarize the results of testing.

TABLE 5

Results of 180° Peel Testing Without Dwell

| Adhesive | Maximum Tensile Force (lbs/in) | | | Average (lbs/in) | Failure Mode |
|---|---|---|---|---|---|
| A | 1.61 | 1.86 | 1.78 | 1.75 | Foam tear/clean |
| B | 3.24 | 3.25 | 3.34 | 3.28 | Split |
| C | 2.34 | 2.26 | 2.25 | 2.28 | Split |

TABLE 6

Results of 180° Peel Testing With Dwell

| Adhesive | Maximum Tensile Force (lbs/in) | | | Average (lbs/in) | Failure Mode |
|---|---|---|---|---|---|
| A | 2.63 | 2.53 | 2.76 | 2.64 | 25% adh. split |
| B | 3.34 | 3.28 | 3.21 | 3.28 | Split |
| C | 2.37 | 2.34 | 2.36 | 2.36 | Split |

As demonstrated in the testing results summarized in Tables 5 and 6, after adhering to a surface and upon removal, tape samples according to the present subject matter exhibited a cohesive fracture or separation within the adhesive layer with a corresponding average tensile peel force of less than 3.5 pounds per inch (613 N/m), and in many embodiments less than 3.0 pounds per inch (525 N/m).

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An adhesive tape comprising: a backing defining a first face and an oppositely directed second face and a first adhesive layer of acrylic-free adhesive disposed on at least one of the first face and the second face of the backing,
    wherein the tape exhibits a cohesive failure characteristic, and a 180° peel force greater than 2.0 pounds per inch (350 N/m);
    wherein the adhesive consists of (i) 30 to 40 wt % of a rubber agent, (ii) 49 to 59 wt % of a solid resin, (iii) 5 to 10 wt % of a liquid resin; and (iv) 0.5 to 2 wt % of an additive; and optionally (v) a solvent,
    wherein the first adhesive layer has a coating thickness of 1 to 7 mils; and
    wherein the backing has a thickness of about 5 to 10 mils.

2. The adhesive tape of claim 1, wherein the 180° peel force is greater than 2.5 pounds per inch (438 N/m).

3. The adhesive tape of claim 1 wherein upon application of the tape to a substrate, the acrylic-free adhesive provides a seal and upon removal of the tape from the substrate, damage of the substrate is avoided.

4. The adhesive tape of claim 1, wherein the rubber agent is selected from the group consisting of styrene-butadiene (SB), styrene-butadiene-styrene (SBS), styrene-isoprene (SI), styrene-isoprene-styrene (SIS), random styrene-butadiene (SBR), styrene-butadiene-isoprene multi-block (SBIBS), polyisoprene, and combinations thereof.

5. The adhesive tape of claim 4, wherein the styrene-butadiene (SB) is selected from the group consisting of a linear styrene-butadiene copolymer, a branched styrene-butadiene copolymer, a radial styrene-butadiene copolymer, and combinations thereof.

6. The adhesive tape of claim 1, wherein the solid resin is selected from the group consisting of: $C_5$ to $C_9$ aliphatic hydrocarbons, hydrogenated ester rosins, partially hydrogenated ester rosins, aromatic modified ester resins, pentaerythritol resins, hydrogenated pentaerythritol resins, terpene resins, glycerol ester rosin resins, pentaerythritol tall oil, terpene phenolics, and combinations thereof.

7. The adhesive tape of claim 1, wherein the liquid resin is selected from the group consisting of: hydrogenated resin ester, terpene resins, $C_5$ hydrocarbons, and combinations thereof.

8. The adhesive tape of claim 1, wherein the rubber agent is a styrene butadiene copolymer.

9. The adhesive tape of claim 1, wherein the solid resin is a glycerol ester gum rosin.

10. The adhesive tape of claim 1, wherein the liquid resin is an ester of hydrogenated rosin.

11. The adhesive tape of claim 1, wherein the additive includes at least one from the group consisting of: stabilizers, oils, flame retardants, pigments, fibers, solvents, and combinations thereof.

12. The adhesive tape of claim 1, wherein the additive is a stabilizer.

13. The adhesive tape of claim 12, wherein the stabilizer is hydrolytically stable phosphite processing stabilizer.

14. The adhesive tape of claim 1, wherein the backing is formed from material selected from the group consisting of polymeric materials, homogenous films, woven materials, nonwoven materials, paper, paper-based materials, composite materials, and combinations thereof.

15. The adhesive tape of claim 1, wherein the solvent is toluene.

16. The adhesive tape of claim 1, wherein the amount of solvent is 5%-200% based upon the total solids in the adhesive.

17. The adhesive tape of claim 1, further comprising a second adhesive layer.

18. The adhesive tape of claim 17, wherein the second adhesive layer is adjacent the first adhesive layer.

19. The adhesive tape of claim 18, wherein the acrylic-free adhesive exhibits cohesive failure at the interface of the first adhesive layer and second adhesive layer.

20. The adhesive tape of claim 17, wherein the second adhesive layer is acrylic-free.

* * * * *